United States Patent [19]

Yuito et al.

[11] Patent Number: 4,539,616

[45] Date of Patent: Sep. 3, 1985

[54] THIN FILM MAGNETIC HEAD AND FABRICATING METHOD THEREOF

[75] Inventors: Isamu Yuito, Ohme; Kazuo Shiiki, Tsukui; Atsushi Saiki, Koganei; Yoshio Homma, Hachioji; Noriyuki Kumasaka, Ohme; Yoshihiro Shiroishi, Hachioji; Mitsuhiro Kudo, Nishitama, all of Japan

[73] Assignee: Hitachi, Ltd., Tokyo, Japan

[21] Appl. No.: 400,019

[22] Filed: Jul. 20, 1982

[30] Foreign Application Priority Data

Jul. 27, 1981 [JP] Japan .................... 56-116403

[51] Int. Cl.³ .................... G11B 5/22; G11B 5/20
[52] U.S. Cl. .................... 360/125; 360/119; 360/123
[58] Field of Search .................... 360/125–127, 360/123, 122, 119–120

[56] References Cited

U.S. PATENT DOCUMENTS

| 4,190,872 | 2/1980 | Jones, Jr. | 360/125 |
| 4,219,855 | 8/1980 | Jones, Jr. | 360/123 |
| 4,239,587 | 12/1980 | Koel et al. | 360/127 |

Primary Examiner—John H. Wolff
Attorney, Agent, or Firm—Antonelli, Terry & Wands

[57] ABSTRACT

Herein disclosed is a thin film magnetic head which is so constructed that a conductor layer arranged in a non-magnetic insulating layer isolating two magnetic poles and adapted to form a coil of plural turns has a height made larger than the width and gap thereof. A method of fabricating that head includes the step of forming a non-magnetic insulating layer, the step of etching the insulating layer by using a mask layer formed thereover as a mask, the step of depositing a metal for providing a conductor layer, the step of removing the mask layer together with the metal thereover, and the step forming a coating of a non-magnetic insulating layer thereover, thereby to form the conductor layer. The head thus fabricated has its magnetic recording and reproducing characteristics improved.

13 Claims, 26 Drawing Figures

THIN FILM MAGNETIC HEAD AND FABRICATING METHOD THEREOF

BACKGROUND OF THE INVENTION

1. Field of the Invention

The present invention relates to a thin film magnetic head, which has its recording and reproducing efficiency improved, and a fabricating method thereof, and more particularly to an inductive thin film magnetic head, which has its signal input and output coil improved, and a fabricating method thereof.

2. Description of the Prior Art

A thin film magnetic head according to the prior art is constructed, as shown in section by way of example in FIG. 1, of: second and first magnetic poles 2 and 1 over a magnetically insulative substrate 6; an insulating layer 3 for electrically and magnetically isolating the first and second magnetic poles 1 and 2; and a conductor 4 disposed in the insulating layer 3 to form a signal input and output coil. Incidentally, as the case may be, a magnetic substrate such as Mn—Zn ferrite may be used to act as the second magnetic pole, or a suitable insulating or metal layer is interposed so as to improve the electric insulativeness the contact and so on. By impressing a signal voltage upon the conductor 4, a leak magnetic flux to pass through a magnetic recording medium 5 is established in the gap between the first and second magnetic poles 1 and 2 (i.e., the operation gap) at the front (i.e., the side facing the magnetic recording medium) of the magnetic head, thus effecting the recording operation. On the other hand, the reproduced output is made to appear as an output voltage at the conductor 4 by the so-called "electromagnetic induction" resulting from that the magnetic flux generated by the recording medium 5 passes through the first and second magnetic poles 1 and 2. It is, therefore, conceivable that the signal recording and reproducing operations can be facilitated the more as the number of turns of the coil formed by the conductor 4 is increased the more. As a matter of fact, however, if that number is merely increased, the magnetic circuit is augmented to increase the magnetic resistance so that the efficiency is not always improved. In order to improve the efficiency, it is necessary to wind the coil a number of turns densely as close to the front of the magnetic head as possible. In order to increase the recording current, on the other hand, it is necessary to enlarge the effective sectional area of the conductor. In short, the contradictory problems that the sectional area of the conductor is enlarged in a limited region and that the number of the conductor 4, i.e., the coil is enlarged have to be solved. The method of forming the conductor 4 according to the prior art will be described in the following.

FIGS. 2a to 2d show an example for forming a conductor coil by the wet etching treatment. For simplicity of explanation, only the process of forming the coil will be described. As shown in FIG. 2a, a substrate 8 is coated with an aluminum layer 7 as the conductor, on which a resist pattern 9 is formed by the photo-etching treatment, as shown in FIG. 2b. After that, the Al layer 7 is etched with an etching liquid such as phosphoric acid to form the conductor layer 4, as shown in FIG. 2c. At this time, by the wet etching treatment, an undercut $d_0$ is established below the resist pattern 9, as shown in FIG. 2c, to reduce the sectional area of the conductor 4. On the other hand, since the undercut $d_0$ becomes the larger with the increase in the thickness t of the Al layer 7, it is limited to reduce the width $d_1$ of the conductor 4 and to increase the number of turns, and it is difficult to increase the thickness t thereby to augment the sectional area. The results of the experiments conducted by us, the inventors, have revealed that the undercut $d_0$ is substantially equal to t in case the thickness is small ($t < d_1$). Even if a conductor pattern having a large thickness ($t > d_1$) is to be formed, not only the undercut is further enlarged to a remarkable extend but also the conductor itself is remarkably thinned. As a result, the photoresist pattern may be separated during the etching treatment so that the desired conductor pattern can not be formed in fact. If the Al layer has a thickness of 2 $\mu$m, for example, the width $d_1$ of the conductor 4 is limited by about 5 $\mu$m. FIG. 2d shows the state in which the photo-resist pattern 9 is removed to expose the conductor 4 to the outside so that the formation of the coil is finished.

On the contrary, the reactive sputter etching treatment has been found to provide a working treatment having less undercut $d_0$. FIGS. 3a to 3e show the etching process. As shown in FIG. 3a, the substrate 8 is coated with the Al layer 7, for example, on which the resist pattern 9 is formed, as shown in FIG. 3b. After that, the Al layer 7 is worked by the reactive sputter etching treatment in the atmosphere of a $BCl_3$ gas. During the reactive sputter etching treatment, as shown in FIG. 3c, not only the Al layer but also the resist layer are etched so that the film thickness is gradually decreased. When the etching treatment of the Al layer is finished, the resist has to be still left. This state is shown in FIG. 3d. After that, if the resist layer is removed, as shown in FIG. 3e, the conductor 4 having less undercut can be formed. Therefore, the reactive sputter etching treatment is a working treatment which can form the conductor 4 having a large sectional area more easily than the foregoing wet etching treatment. For example, if a positive resist pattern 9 having a thickness of 2 to 3 $\mu$m is used, an Al layer 7 having a thickness of 4 $\mu$m can be worked with substantial fidelity to the resist pattern 9. However, if the thickness of the resist is made larger than 2 to 3 $\mu$m, a fine working treatment becomes difficult during the formation of the resist pattern 9 so that the pattern width $d_4$ and the pattern gap $d_3$ shown in FIG. 3b cannot be reduced. On the other hand, if the thickness h of the Al layer 7 is larger than the resist pattern gap $d_3$ (i.e., $h > d_3$), it becomes difficult to etch the deep portion of the Al layer 7. In other words, the reactive sputter etching treatment is more effective than the wet etching treatment but finds it difficult to form the conductor 4 which has such a thickness as is defined by $h > d_1$ and $h > d_2$, for example, $h > 5$ $\mu$m, $d_1 < 3$ $\mu$m and $d_2 < 3$ $\mu$m.

By the reasons thus far described, there have been practised in the thin film magnetic head of the prior art the methods by which the coil conductor 4 is composed of two and three layers in order to prevent the magnetic circuit from being increased as a result that the width $d_1$ of the coil conductor 4 is enlarged to augment the sectional area. However, those methods are not industrially desirable because they have an increased number of steps and a lowered yield.

The following references are cited to show the state of the art: (i) Japanese Patent Laid-Open No. 55-84019; (ii) Japanese Patent Laid-Open No. 55-84020; and (iii) Japanese Patent Laid-Open No. 55-12522.

SUMMARY OF THE INVENTION

It is, therefore, an object of the present invention to provide an inductive thin film magnetic head, which is freed from the aforementioned difficulties concomitant with the prior art and which has its signal input and output coil improved to enhance the recording and reproducing efficiency, and a method of fabricating the thin film magnetic head.

In order to achieve the aforementioned object, the thin film magnetic head of the present invention is constructed such that it is composed of a first magnetic pole, a second magnetic pole, a non-magnetic insulator sandwiched at least between said first and second magnetic poles for magnetically and electrically isolating a portion of said two magnetic poles, and a conductor layer disposed in said insulator for forming a coil having a plurality of turns, and such that the height of each section, or turn, of said conductor layer is made larger in at least one portion of said conductor layer than the width of the cross-section (that is, the width of each turn), and the gap between sections of said conductor layer forming the turns of said coil. By this construction, it is possible to provide a thin film magnetic head which has an increased number of turns of the coil formed by the conductor layer even if this conductor layer is constructed of a single layer and in which the conductor layer has an enlarged sectional area. Moreover, it is possible to form the coil in a portion close to the operation gap of the magnetic head.

FIG. 4 shows the sectional construction of the thin film magnetic head according to the present invention. A conductor 10 is elongated with respect to the substrate 3 and occupies most of the thickness of the insulating layer 3. Moreover, the width $d_5$ of the conductor 10 is so small that the number of turns can be densely increased at the front of the head thereby to improve the recording and reproducing efficiency. On the other hand, the height of the conductor layer is larger preferably 1.5 times and more preferably 2.0 times than the width of the same.

Moreover, the height of the conductor layer is larger preferably 1.5 times and more preferably 2.0 times than the gap of the same.

The aforementioned non-magnetic insulating layer conveniently has at least its portion made of a high molecular resin such as a polyimide resin (which is excellent in heat-resistance and insulation) but is not limited thereto.

The aforementioned conductor layer is inclined, as shown in FIG. 7, in a direction, in which the first magnetic pole near the operation gap is inclined, thereby to further shorten the distance between the operation gap portion and the conductor layer, so that the recording and reproducing efficiency can be further improved.

The aforementioned thin film magnetic head according to the present invention can be easily fabricated by the method including the following steps. More specifically, the thin film magnetic head of the present invention can be fabricated by forming an operation gap forming first non-magnetic insulator layer over a second magnetic pole for forming a lower core, by forming a second non-magnetic insulator layer thereover, by subsequently forming such a thin film of a predetermined shape thereover as can effect the selective etching treatment with said second non-magnetic insulator layer, by etching said second non-magnetic insulator layer while using said thin film as a mask, by subsequently depositing a metal acting as a conductor layer, by etching said thin film selectively relative to said conductor layer and said second non-magnetic insulator layer to remove the excessive portion of said metal thin film thereby to form a conductor layer, by spin-coating the third non-magnetic insulator layer with a conductor layer, for example, and by patterning the respective insulator layers into a desired shape thereby to coat a portion of said insulator layers and said second magnetic pole with a magnetic layer for providing said first magnetic pole.

In the fabricating method thus far described, on the other hand, the thin film magnetic head can also be fabricated by etching the non-magnetic insulator layer, which is formed on the second magnetic pole, into a desired pattern, by subsequently removing the thin film which has been used as the mask, by making a slightly thinner metal for providing the conductor layer than said non-magnetic insulator layer, by spin-coating a non-magnetic insulator layer, for example, by etching said non-magnetic insulator layer until the coating metal layer appears, by subsequently etching that conductor layer metal on the non-magnetic insulator layer, which is the first coating, while using said non-magnetic insulator layer as a mask, and by subsequently conducting the forming step of the insulating layer, the patterning steps of the respective insulator layers and the coating step of the magnetic layer for providing the first magnetic pole.

Incidentally, the aforementioned second magnetic layer may be replaced by a magnetic substrate which is made of a magnetic material having a high magnetic permeability such as highly permeable ferrite.

DESCRIPTION OF THE PRESENTLY PREFERRED EMBODIMENTS

Example 1

Figure 5A:
FIGS. 5a to 5h are schematic sectional views showing the steps of fabricating the thin film magnetic head according to the embodiment of the present invention.
Figure 5B:
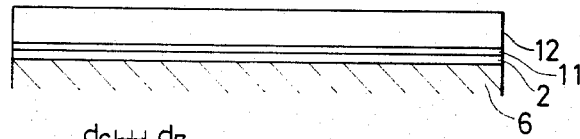
Figure 5C:
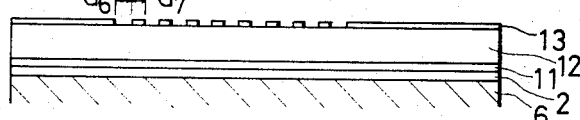
Figure 5D:
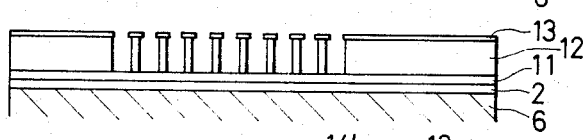
Figure 5E:
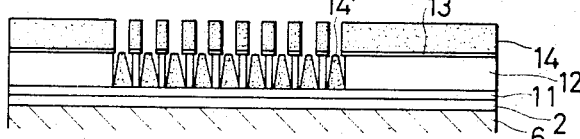
Figure 5F:
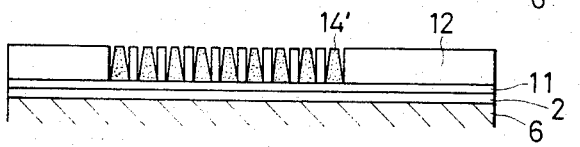
Figure 5G:
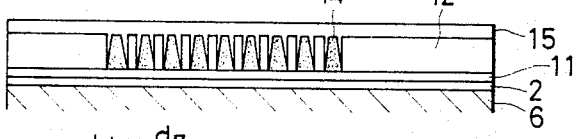
Figure 5H:
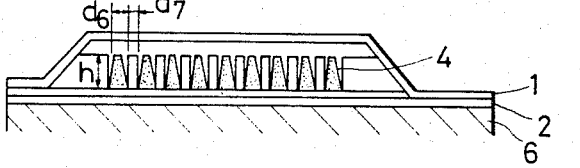

The description will be made with reference to FIGS. 5a–5h. Photoceram (which is known as the product of Corning Glass Works, a corporation of USA) was used to make the substrate 6. First of all, on said substrate 6, there are laminated a magnetic layer for providing the second magnetic pole 2 and a magnetically and electrically insulating layer 11 for providing the gap at the front of the magnetic head (as shown in FIG. 5a). Here, the magnetic layer 2 was made of permalloy (i.e., an alloy containing 80 wt. % of Ni and 20 wt. % of Fe) having a thickness of 2 μm, and the insulating layer 11 was made of SiO$_2$ having a thickness of 2 μm, both by the sputtering treatment. Next, there was spin-coated to said insulating layer 11 a PIQ (i.e., a polyimide resin which is known under the trade mark of Hitachi Kasei Kogyo KK) as an insulating layer 12 for isolating the first and second magnetic poles until it acquired a thickness of 8 μm (as shown in FIG. 5b). After that, Mo 13 is vacuum-evaporated upon said PIQ to have a thickness of 0.4 μm and is patterned to have such thicknesses as are expressed by $d_6=3$ μm and $d_7=2$ μm by the photo-etching treatment (as shown in FIG. 5c). Moreover, by the sputter-etching treatment of the PIQ in the well-known oxygen atmosphere while using said Mo layer 13 as a mask, the PIQ is formed with grooves which are so deepened as to reach the insulating layer 11. In this case, the sputter-etching rate of the Mo to the PIQ is so low that the Mo layer is hardly etched. Similar results were obtained even if Cr was used in place of Mo. On the other hand, an undercut of about 0.5 μm is established in the PIQ below the Mo mask (as shown in FIG. 5d). Next, aluminum 14 and 14' for providing the conductor layer 4 was deposited generally at a right angle to the substrate thereby to have a thickness substantially equal to that (i.e., 8.0 μm) of the PIQ (as shown in FIG. 5e). Here, the Al is deposited on the upper surface of the Mo mask 13 but is not secured to the undercut portion of the Mo mask 13. Thus, if a voltage is impressed upon the Al layer 14 to electrolytically and selectively etch the Mo layer 13 in a solution of sulfamic acid, as is well known in the art, the Mo layer and the Al layer on the Mo mask are removed (as shown in FIG. 5f). At this state, there is obtained a shape in which the Al conductor is buried in the grooves formed in the PIQ. After that, so that the gap between the PIQ layer 12 and the Al layer 14' may be flattened and so that the Al conductor and the first magnetic pole 1 may be electrically insulated, a PIQ layer 15 is again spin-coated (as shown in FIG. 5g). If the gap between the Al layer 14' and the PIQ layer 12 is 0.5 μm and if the thickness of the PIQ layer 15 is 2 μm, the surface roughness the PIQ layer 15 can be easily reduced to about 0.1 μm. At last, the magnetic head is completed (as shown in FIG. 5h) by patterning the PIQ layers 12 and 15 and the insulating layer 11 and by vacuum-evaporating the permalloy upon a portion of said PIQ and the second magnetic pole 2 thereby to form the first magnetic pole 1.

The width of the conductor formed in the present example, i.e., the minimum value of that one continuous conductor length $d_6$, which was measured in the direction of the front of the magnetic head formed with the magnetic gap, is about 3 μm. The height of the conductor, i.e., the continuous length, which is projected in the direction of the front of the magnetic head formed with the magnetic gap of the conductor layer, is about 8.0 μm, and the distance $d_7$ between the adjoining conductors is about 2 μm at the minimum. As a result, the conductor 4 had a sectional area of about 20 μm$^2$. If the conductor 4 having the same width of 3 μm as that of the present example is formed by the aforementioned reactive sputter-etching treatment, its height is limited to about 3 μm. In other words, the sectional area of the coil conductor can be enlarged according to the present inventon twice as high as the prior art method. Moreover, since the coil can be wound numerous turns in the vicinity of the front of the magnetic head, the head can enjoy an excellent recording and reproducing efficiency. Specifically, the thin film magnetic head of the present example can improve the recording and reproducing characteristics to a higher level of about 3 dB than the conventional magnetic head. The present invention is characterized in that the height h of the conductor is made larger than the width $d_1$ (i.e., $d_6$ in the present example) and the gap $d_2$ (i.e., $d_7$ in the present example) between the conductors. That efficiency is further improved when the first magnetic pole is spaced from the second magnetic pole and when most of the insulating layer existing inbetween is occupied by the conductor. Therefore, it is desired that $h/d_1 \geq 1.5$ holds, and it is possible to have a remarkably satisfactory recording and reproducing efficiency for $h/d_1 \geq 2$.

The steps of FIGS. 5e and 5f are similar to the treatment which is usually known as the "lift-off treatment". In the lift-off treatment, however, the layer (which corresponds herein to the PIQ layer 12) to be used for forming the conductor is finally removed. In the present example, on the contrary, the flattening step shown in FIG. 5g was facilitated by leaving said PIQ layer 12. Specifically, if that layer is removed, the roughnesses of about 8.0 μm have to be flattened with the resultant remarkable difficulty. It is utilized that the PIQ can be used as an insulating layer for electrically and magnetically isolating the first and second magnetic poles because it has a satisfactory electric insulation and an excellent heat-resistance and that the flattening can be easily effected by the spin-coating. As shown in FIG. 5e, moreover, the excessive Al layer is removed at the boundary of the Mo layer 13 so that there arises no problem even if the Al flows around to stick the recessed wall of the PIQ. By the process thus far described in the present example, the Al conductor could be formed relatively easily and with excellent reproductivity within a range of $h < 3d_6$.

Example 2

The magnetic head was fabricated without any special problem by a method similar to that of the example 1 except that the substrate 6 was made of ferrite to act as the second magnetic pole thereby to omit formation of the magnetic layer 2.

Example 3

Figure 6A:
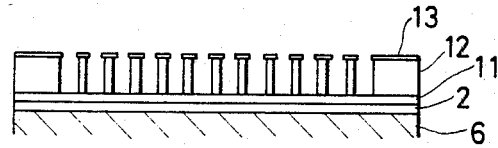
FIGS. 6a to 6f are schematic sectional views showing the steps of fabricating the conductor layer of the magnetic head according to another embodiment of the present invention.
Figure 6B:
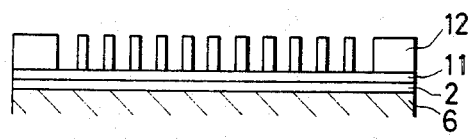
Figure 6C:
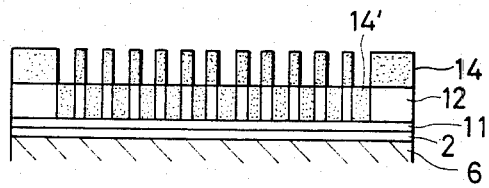
Figure 6D:
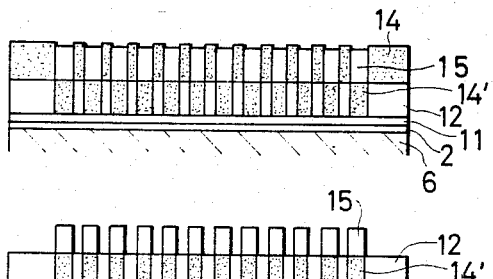
Figure 6E:
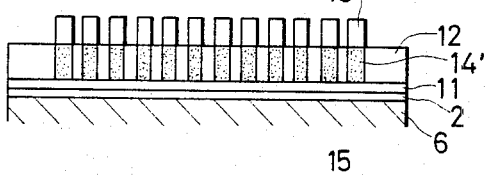
Figure 6F:
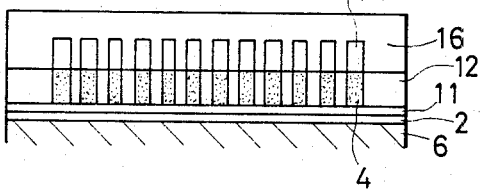

In the present example, the conductor 4 was formed by such a method as will be described in the following. The forming process is shown in FIGS. 6a to 6f. FIG. 6a shows an intermediate product prepared similarly to that of the example 1 and corresponds to FIG. 5d. Next, the Mo layer 13 is removed (as shown in FIG. 6b), and the Al layer 14 is then laminated to have a layer of 8.0 μm substantially equal to that of the PIQ layer 12 (as shown in FIG. 6c). Moreover, the PIQ 15 is spin-coated to said Al layer 14. Since the PIQ has fluidity, its surface is so flattened to have a roughness of about 1 μm if it is applied to have a thickness of about 20 μm. After that, the PIQ is etched (as shown in FIG. 6d) until the protruding upper furface of the Al layer 14' appears, and the Al layer 14 is then etched by using said PIQ layer 15 as a mask. The etching treatment is effected only at the lands of the PIQ layer 12 (as shown in FIG. 6e). At this time, there is formed a shape in which the Al is buried only in the recessed portion of the PIQ layer. Finally, in order to flatten the roughnesses of the PIQ layer 15, the PIQ layer 16 is again spin-coated (as shown in FIG. 6f). By the steps thus far described, the Al conductor layer having a width of 3 μm and a height of 8.0 μm could be formed. The thin film magnetic head having excellent recording and reproducing characteristics could be fabricated while leaving the remaining steps similar to those of example 1.

Example 4

In the thin film magnetic head according to the present invention, the formation of the conductor layer does not include the etching step of said conductor itself. Therefore, the present example is especially effective for a material, which is difficult to etch, by the reason that the undercut during the etching treatment is large. In the present example, there is used as the conductor layer the Cu which is excellent in resistance to electromigration and which is preferable in life. This Cu is usually etched in an aqueous solution of ammonium peroxysulfate but raises a problem such as the oxidation of the Cu surface or the deterioration in the patterning precision. According to the method of the present invention, the thin film magnetic head, which was freed from any of the problems of the foregoing items and which had its reliability remarkably improved, could be fabricated.

Example 5

The PIQ is a high molecular resin which is excellent in heat resistance and insulation. The thin film magnetic head according to the present invention could be fabricated by the similar steps even by using Cyclopolybutadiene which is known under the trade mark of Nippon Gosei Gom KK, a corporation of Japan) or Pyraline (which is known under the trade mark of Dupont, a corporation of USA) in place of the aforementioned PIQ.

Example 6

Figure 1:
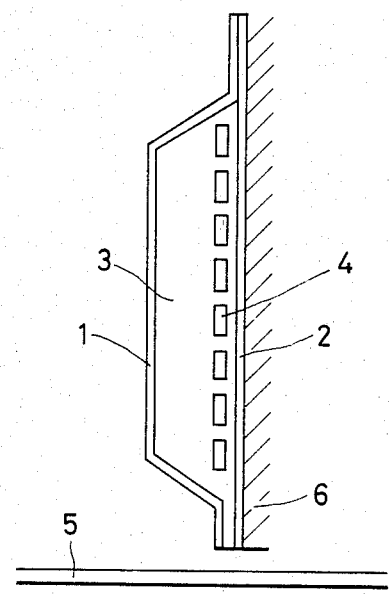
FIG. 1 is a schematic sectional view showing a thin film magnetic head of the prior art.
Figure 4:
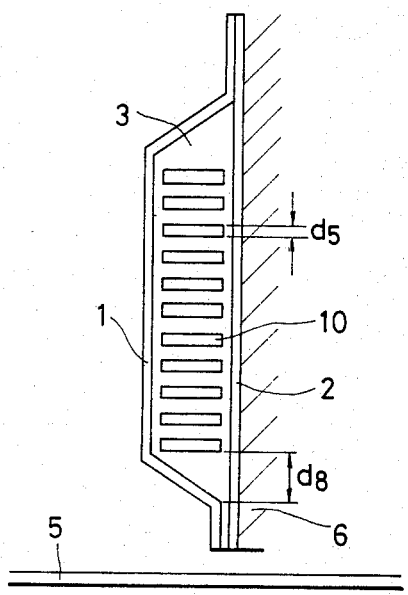
FIG. 4 is a schematic sectional view showing the thin film magnetic head according to one embodiment of the present invention.
Figure 7:
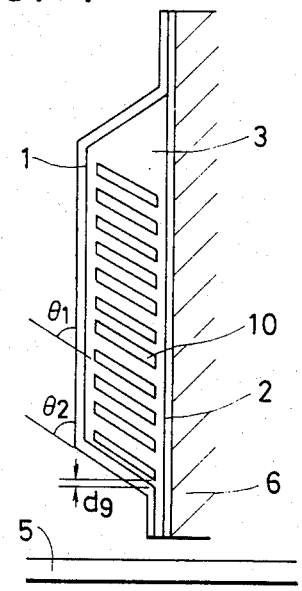
FIG. 7 is a schematic sectional view showing the thin film magnetic head according to a further embodiment of the present invention.
Figure 2A:
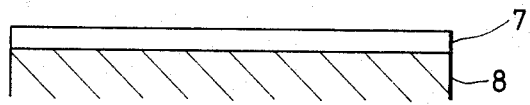
FIGS. 2a to 2d and FIGS. 3a to 3e are sectional views showing the steps of forming the conventional conductor coil by the wet and dry treatments of the conductor layer, respectively.
Figure 2B:
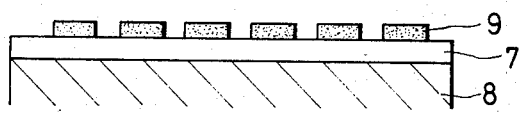
Figure 2C:
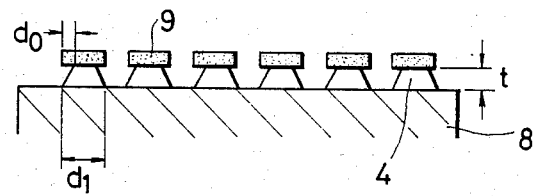
Figure 2D:
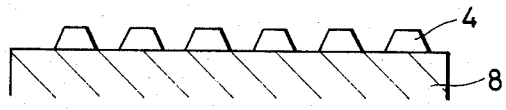
Figure 3A:
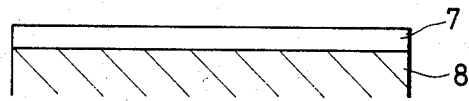
Figure 3B:
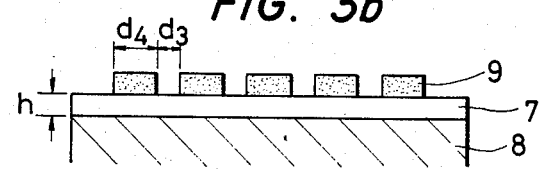
Figure 3C:
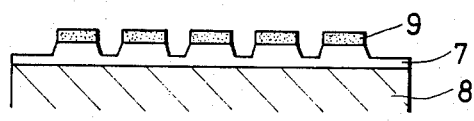
Figure 3D:
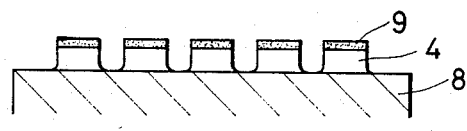
Figure 3E:
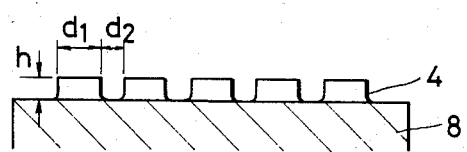

In the thin film magnetic head according to the present invention, as shown in FIG. 4, so that the magnetic flux may be effectively emitted from the front of the magnetic head, the conductor 10 is desired to be formed as close to the magnetic head as possible. In the embodiment shown in FIG. 4, since the conductor 10 is vertically elongated relative to the substrate 6, the distance $d_8$ between the trailing end of the gap and the conductor 10 is liable to be enlarged. In the present example, on the contrary, by inclining the conductor 10 relative to the substrate 6, as shown in FIG. 7, th distance $d_9$ between the trailing end of the gap and the conductor 10 is made shorter than the distance ($d_8$) of the case of FIG. 4. It is preferred that the angle $\theta_1$ of inclination of the conductor 10 is substantially equal to the angle $\theta$ of inclination of the shoulder portion of the first magnetic pole 1 in the vicinity of the front thereof. For $\theta_1 > \theta_2$, the distance $d_8$ cannot be made small, and for $\theta_1 < \theta_2$, the conductor 10 and the first magnetic pole 1 are undesirably spaced at the shoulder of the first magnetic pole 1.

The thin film magnetic head according to the present example can be fabricated by a process substantially similar to that of the example 1. However, it is necessary to effect the sputter-etching treatment of the PIQ and the formation of the conductor layer 10 at the inclination angle ($\theta_2$).

Obviously, many modifications and variations of the present invention are possible in the light of the above teachings. It is, therefore, to be understood that within the scope of the appended claims the invention may be practised otherwise than as specifically described.

What is claimed is:

1. A thin film magnetic head comprising: first and second magnetic pole layers; a non-magnetic insulating layer sandwiched between at least said first and second magnetic pole layers; said first and second magnetic pole layers forming an operation gap through said insulating layer; and a conductor layer disposed in said insulating layer and forming a coil of plural turns, with each turn of said coil having a height in a direction extending from the first to the second magnetic pole layer and having a width, and with a space between successive turns of the coil, and wherein the height of each turn is made larger in at least a portion of said coil than the width of said turn and than the space between said turn and an adjacent turn.

2. A thin film magnetic head as set forth in claim 1, wherein the height of each turn is at least 1.5 times as large as the width of the same turn.

3. A thin film magnetic head as set forth in claim 2, wherein the height of each turn is at least 2 times as large as the width of the same turn.

4. A thin film magnetic head as set forth in claim 1, wherein the height of each turn is at least 1.5 times as large as the space between that turn and an adjacent turn.

5. A thin film magnetic head as set forth in claim 4, wherein the height of each turn is at least 2 times as large as the space between that turn and an adjacent turn.

6. A thin film magnetic head as set forth in claim 1, wherein said first magnetic pole layer has an inclined portion extending to said operation gap, and each turn of the coil has its height extending in a direction parallel with the inclined portion of said first magnetic pole layer.

7. A thin film magnetic head as set forth in any of the preceding claims 1 to 5 and 6, wherein at least a portion of said non-magnetic insulating layer is made of a high molecular resin.

8. A thin film magnetic head as set forth in claim 7, wherein said high molecular resin is a polyimide resin.

9. A thin film magnetic head as set forth in claim 1, wherein said second magnetic pole layer extends perpendicular to the direction in which the the height of each turn of the coil extends.

10. A thin film magnetic head as set forth in claim 1, wherein said second magnetic pole layer is the substrate for the head.

11. A thin film magnetic head as set forth in claim 1, wherein the conductor layer is made of aluminum.

12. A thin film magnetic head as set forth in claim 1, wherein the conductor layer is made of copper.

13. A thin film magnetic head as set forth in claim 1, wherein said coil is a flat coil.

* * * * *